INVENTOR
Paul O. C. ROUET

March 17, 1970    P. O. C. ROUET    3,501,239
MEASURING DEVICE FOR THE MAXIMUM VISUAL
DISTANCE IN THE FOG
Filed Oct. 11, 1965              6 Sheets-Sheet 2

OBSERVATION SCREEN

THREE CONSECUTIVE LIGHTS
500 m.

600 m.

700 m.

800 m.

1.000 m.

1200 m.

1400 m.

1.700 m.

2.000 m.

2.500 m.

3.000 m.

INVENTOR
Paul O. C. ROUET

ATTORNEY

United States Patent Office 3,501,239
Patented Mar. 17, 1970

3,501,239
MEASURING DEVICE FOR THE MAXIMUM
VISUAL DISTANCE IN THE FOG
Paul O. C. Rouet, Marcinelle, Belgium, assignor to Ateliers de Constructions Electriques de Charleroi (ACEC), Brussels, Belgium
Filed Oct. 11, 1965, Ser. No. 494,537
Claims priority, application Belgium, Oct. 14, 1964, 654,344; Apr. 7, 1965, 662,165
Int. Cl. G01n 21/22
U.S. Cl. 356—103                                5 Claims

ABSTRACT OF THE DISCLOSURE

This invention relates to an installation for measuring the maximum visual distance in the fog comprising a series of signal elements and at least one observation apparatus in which an optical system is arranged for observing the series of signal elements, a screen on which the optical system projects the image of certain signal elements of the series as well as an image of their surroundings, and a control device for operating certain signalling elements of the series to render them visible and simultaneously modify the focal distance of the optical system in such a manner that when the visibility is perfect, the image of at least one signal element and of its surrounding appear on the screen always about the same size independent of the distance between the operated signal element and the optical system.

---

The invention relates to a device permitting to define in a simple and indisputable manner the maximum visual distance in the fog of beaconing projectors, signal lights for obstacles or other similar objects to be found for example on airport runways, in seaports or in certain drainage basin.

Installations for measuring the visual distance in the fog are already known but these installations do not take into consideration the visibility conditions such as the ones met by airplane or boat pilots whose eyes are automatically adapted to the distance of an object or of a precise luminous point and to the surrounding luminosity.

Such a known system consists for example of a series of signal lights at a distance of 100 m. The number of visible lights also gives the maximum visual distance in the fog in hectometers. This system gives wrong results especially with dim light, because the meteorologist observer is dazzled by the light of the nearest signal light. These errors are emphasized if the direct observer is replaced by an optical screen, for example the screen of a television receiver. The invention may be applied in all the above-mentioned cases.

The object of the invention is to facilitate the observation of the evolution of the maximum visual distance according to the weather.

According to the invention, the installation for measuring the maximum visual distance in the fog comprises:

At least one series of signal lights which may be switched on at will,

At least an observation system projecting the said series of signal lights on a screen placed in front of an observer and At least a control device, simultaneously directed to the switching on of certain signal lights of the series and to the adjustment of the optical system for the observation of one of the lighted signal lights.

The signal lights may be replaced by retractable targets, if the objects for which the maximum visual distance is to be measured are not points having their own luminosity. The adjustment of the observation optical system may be replaced by an intervention in the electronic control of the television system. The modifications fall within the embodiment of the invention.

The observation optical system may be adjusted to obtain on the screen, an image of the aimed light which is always at the same place and of the same size.

In order to continually follow the evolution of the visual distance in the fog, the control of the observation optical system simultaneously releases for each step the switching on of at least two signal lights, making part of a series of signal lights in which the distance from a signal light of the observation point is approximately equal to the distance of the preceding signal light, plus a given percentage of said distance.

The invention is hereunder explained by means of a few examples represented by the annexed drawing in which:

FIGURE 21 shows a detecting device when two signal lights are simultaneously on;

In order to facilitate the measuring of the display of the maximum visual distance in the fog, the screen placed before the observer consists of one or a plurality of photosensitive elements having a measurable property which varies in proportion of the signal lights projected on the screen is obtained by one or a plurality of measuring devices of the said property; the output signals of said measuring devices affect the control circuit comprising a function generator whose output signal provides the visibility threshold of a luminous point in function of the surrounding luminosity and other eventual data, and comprising at least a comparison device fed by an output signal of the function generator and the output signal of the measuring device, this control circuit acting on the control device simultaneously directed to the switching on of certain signal lights of the series and to the adjustment of the observation system on one of the lighted signal lights.

Figure 1:
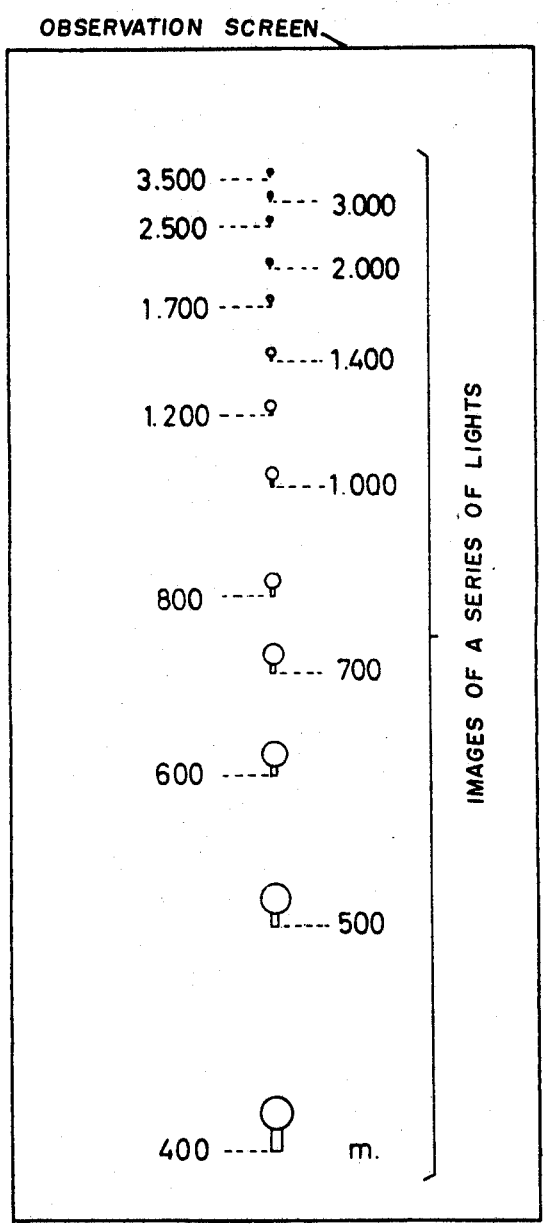
FIGURES 1 to 12 show observation screens.
Figure 2:
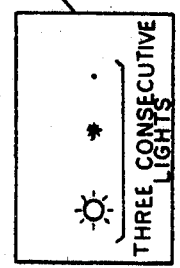
Figure 3:
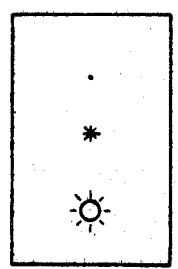
Figure 4:
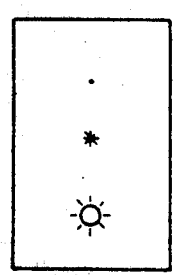
Figure 5:
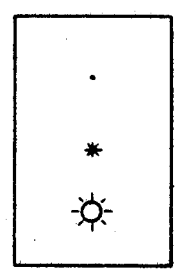
Figure 6:
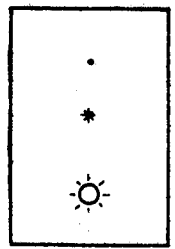
Figure 7:
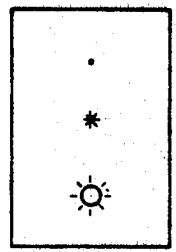
Figure 8:
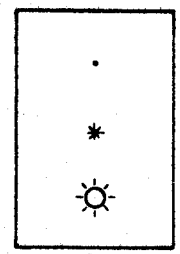
Figure 9:
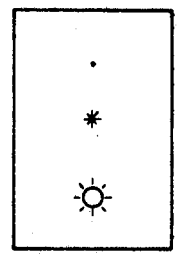
Figure 10:
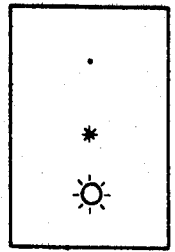
Figure 11:
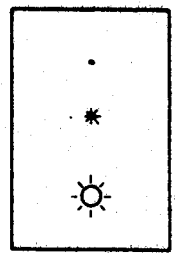
Figure 12:
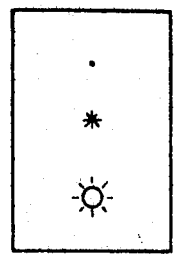

FIGURE 1 shows the projected image on a screen of a series of signal lights. This image is obtained by placing an observation apparatus, for example a television camera, in the alignment of the signal lights and at a given height above the said lights. The signal lights are located at the following distances in view of the camera: 400, 500, 600, 700, 800, 1000, 1200, 1400, 1700, 2000, 2500, 3000 and 3500 m. This series of distances is obtained by rounding of the hectometer values of a theoretical series (392, 470, 565, 680, 816, 980, 1180, 1420, 1705, 2050, 2460, 2960, 3560 m.) in which each value is equal to the preceding one plus 20% of the latter. If the values of the theoretical series are chosen for the distances of the signal lights, the approximate values may be used as nominal values. In the present example, the signal lights are located according to the series of the approximate values. The resulting irregularities are shown in FIGURE 1; they are tolerable in most cases.

The television camera is equipped with an adjustable optical system, for example a lens of variable focal length which is known per se, or a series of objectives on a rotatable turret. The optical system may be remotely adjusted. The adjustment is simultaneously made with the switching on of three signal lights of the series. A commercial lens, having a variable focal length from 17 mm. to 100 mm. is sufficient for the example presently considered, because it can give an image having the same magnitude for all the signal lights between 500 m. and 3000 m.

It is possible to switch on only one signal light at the time in order to judge each time its visibility. This is useful when the measuring of the maximum visual distance is made when an airplane is expected. On the other hand, if the continuous evolution of the maximum visual distance is desired, along a plurality of runways, the observer controls permanently a plurality of screens and the corresponding display. In this case, it is advantageous to control on each runway the switching on of three signal lights and adjust the optical system of the camera in such a way that the location of the three signal lights are always located approximately at the same place on the screen corresponding to the runway.

FIGURES 2 to 12 show different aspects of a screen when the installation is continuously adjusted to the maximum visual distance. The maximum visual distance is defined by the distance of the signal light which is barely perceptible represented by a star located in the median part of the screen, between the clearly perceptible signal light (circle with rays) and the third signal light, which is imperceptible (point). The evolution of the maximum visual distance may be continuously and easily followed because on the screen the median signal light must be barely perceptible. As soon as on the screen this signal light disappears and the lower signal light grows dim, the maximum visual distance has decreased in the corresponding runway. On the other hand as soon as on the screen a third signal light appears in the upper part, the maximum visual distance has increased. By appropriately selecting the distance between the signal lights and their corresponding intensity, it is possible to follow with great precision the evolution of the visibility because at the moment the installation is set at the maximum visual distance, two signal lights are perceptible at determined locations on the screen. As soon as only one signal light or three signal lights are perceptible, the setting of the installation must be modified by the observer.

The setting may be done for example by means of a revolving switch or a series of press-buttons located beside each screen which controls a runway. The switch on control of the signal lights and their adjustment is made by means of appropriate regulating circuits which are known per se. The regulating circuits may be completed by a remote display installation, which permits to signal the maximum visual distances of the various runways at the various locations where the knowledge of such magnitude is useful.

Figure 13:
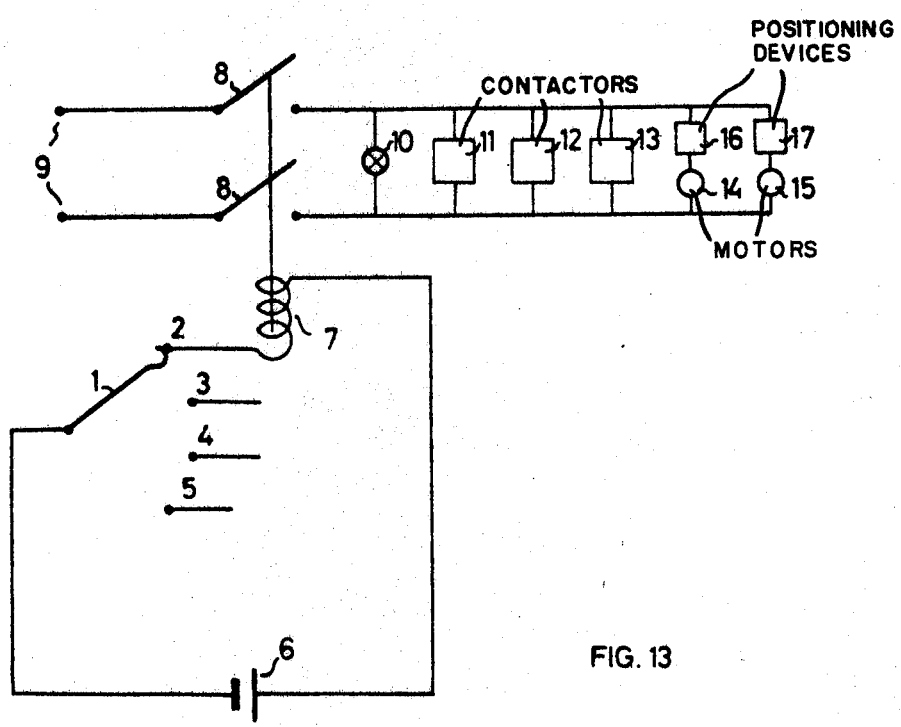
FIGURE 13 shows a diagram of the electrical control.

The control of the installation may for instance be made in the following manner: (FIG. 13) a revolving switch, represented by a rotating arm 1, allows the selection of one circuits 2, 3, 4, 5 among an adequate number of control circuits of contact studs. The switch is placed beside the screen: each circuit corresponds to a maximum visual distance. On FIGURE 13, only circuit 2 is shown in detail. All other circuits are nevertheless similar. At the moment the contact arm 1 closes circuit 2, a current is established between the terminals of the current source 6 and energizes a contactor coil 7 to close contacts 8. At this moment a voltage 9 is applied simultaneously to the terminals of elements 10, 11, 12, 13 and 15. As a result, a motor 15 regulating the focal distance of the optical system is actuated until a path limiting switch in a positioning device 17 stop the operation of motor 15. Another motor 14 is actuated to set line of sight of the camera for example on the signal light at 1200 m. As soon as the correct line of sight is obtained, a path limiting switch 16 stops the operation of motor 14. Three contactors 11, 12, 13 switch on three consecutive signal lights of the series, for example 1000, 1200 and 1400 m.; one or a plurality of signal lamps 10 permit the illumination of one or a plurality of display signs of the maximum visual distance.

Figure 16:
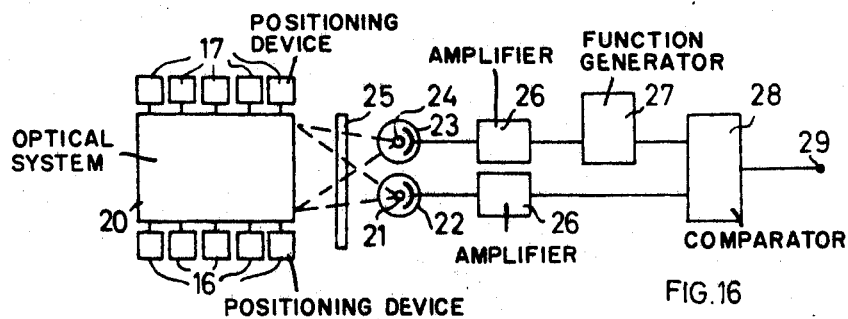
FIGURES 16 and 17 show arrangements with a multifocal optical system.

In FIGURE 16, an optical system having a variable focal length 20 is equipped with a plurality of positioning devices 17 of the focal distance each of said devices corresponding to a signal light of a series of signal light located on the ground. Other positioning devices 16 are used to control the correct alignment of the optical system for each of the signal lights. In the most simple case, these positioning devices are for instance path end switches. The optical system 20 which is properly adjusted projects the image of a signal light on the sensitive electrode 21 of the photo-electric cell 22. A second photoelectric cell 23, located beside cell 22, receives the image on the electrode 24 of a location which is not illuminated by the signal light, representing the surrounding luminosity. The screen or light responsive means is constituted, in this example, by two small fragments, that is, the two sensitive electrodes of the photo-electric cells 22 and 23. Each of these cells produces a measurable photo-electric current whose intensity is function of the intensity of the visible light falling upon them. If the sensitive electrodes of cells 22 and 23 react equally to invisible components of the light, for example to certain infrared rays, an appropriate filter 25 is located in the path of the rays, so that the visible light alone would be responsible for the measured results.

The intensity of the photoelectric current generated in cell 23 is function of the intensity of the surrounding light. Then, at each intensity value of the surrounding light corresponds a visibility threshold, that is, a minimum intensity of light, transmitted by a luminous point, which can be barely distinguished by an airplane pilot. This minimum intensity of light is function of the intensity of the surrounding light and eventually of other data; it may be determined once and for all by experimental means. The element which takes into consideration these experimental means is a function generator 27 which with certain settings, not shown, may take into consideration secondary influences such as snowy or wet ground, short and dry grass or high and green grass etc. The input of the function generator 27 is constituted by the photoelectric current of cell 23 or a signal proportional to the latter, for instance the one which appears at the output of an amplifier 26. The output of the function generator 27 is a signal which corresponds to the visibility threshold, that is, to a minimum intensity required so that the image of a luminous point be perceptible.

The photo-electric current of cell 22 is a representation of the intensity with which a signal light penetrates the fog. If this intensity is weaker than the visibility threshold, the photoelectric current of the cell is weaker than the output signal of the function generator 27. It is obvious that if the output of cell 23 has been amplified in an amplifier 26, the output of cell 22 is amplified in an identical amplifier 26. If on the contrary, the intensity with which the signal light penetrates the fog exceeds the visibility threshold, the corresponding signal is greater than the one appearing at the output of the generator 27. These two signals are brought at the input of a comparison circuit 28 whose output terminal is, for example, at a voltage of $-12$ v., if the visibility threshold of the light striking cell 22 is not reached and at a voltage of $+12$ v. if on the contrary the signal light is visible.

The maximum visual distance in the fog may be displayed in a permanent manner in all places where its identification is useful; all is needed is the operation of required telecommunication means. In what follows, the display is always represented by a pilot light, but it goes without saying that the pilot light is only an illustration of any other posting means by telecommunication.

Figure 14:
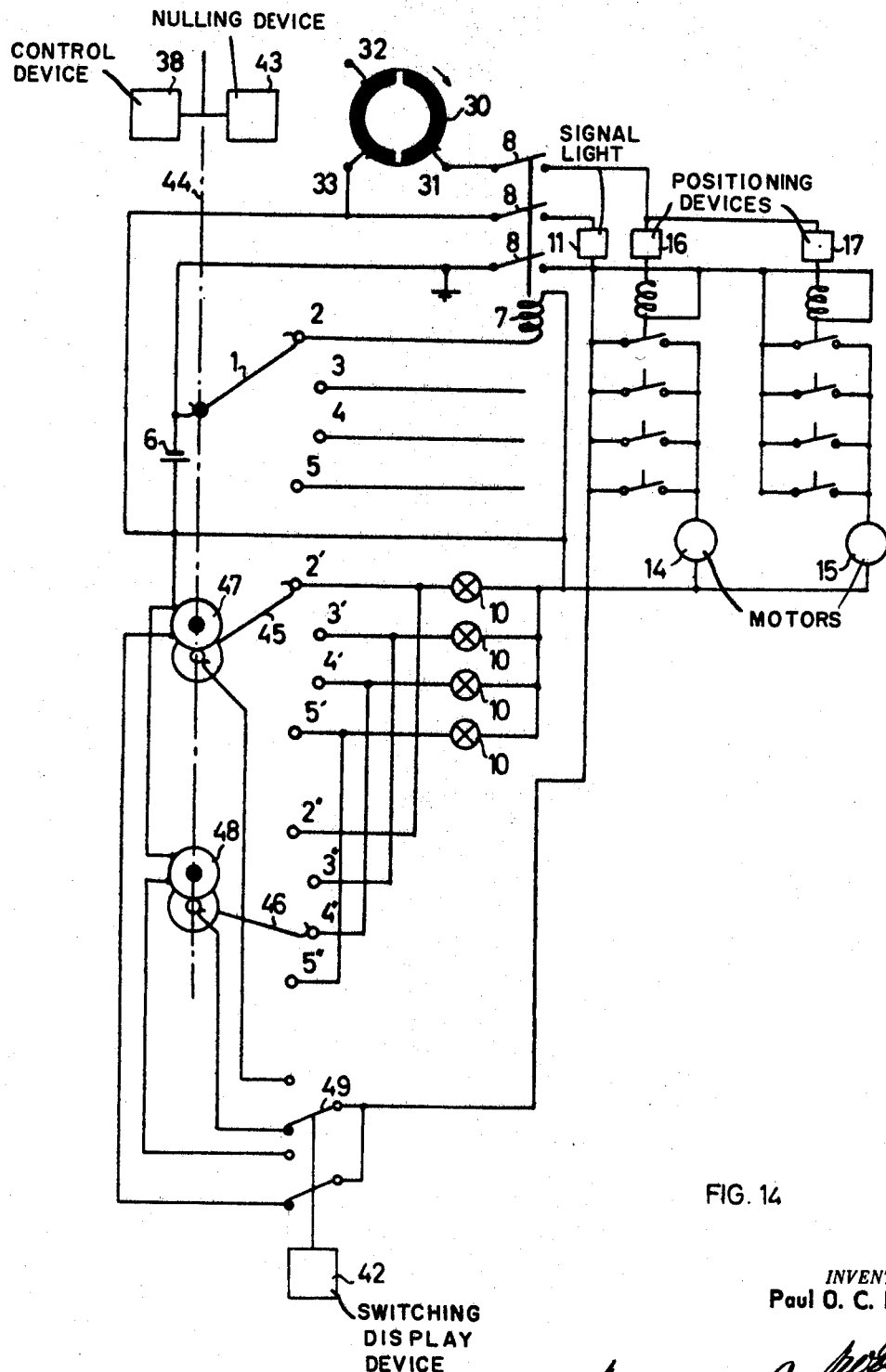
FIGURE 14 shows an electrical circuit for the automatic control of the device.

The circuits according to FIGURE 14 show how the measure of the maximum visual distance and its display may be executed by an automatic device.

A revolving switch, represented by a moving arm 1 enables to choose one of the circuits 2, 3, 4, 5 among an adequate number of control circuits of contact studs. Each circuit corresponds to a maximum visual distance represented by the distance between a traffic signal and the optical system 20 (FIG. 16). In FIGURE 14, only circuit 2 is shown in detail. Nevertheless all the other circuits are similar. When the moving arm 1 closes circuit 2, a current is established between the terminals of a source 6 and energizes a contactor coil 7, which closes the contacts 8. At this moment a signal light 11 lights up. Two positioning devices, one, 16, enabling to adjust the alignment of the optical system on the illuminated signal light and the other, 17, enabling to adjust the focal length are connected to a terminal 31 of a time switch represented by a disc 30, rotating without interruptions at a uniform speed. At each half-rotation of disc 30, the voltage appearing at a terminal 33 is alternatively applied to terminal 31, and terminal 32. The rotational speed of the disc 30 is chosen in such a way that the positioning of the optical system may be easily obtained during one quarter of a turn of the said disc 30. When a difference of potential is applied on the devices 16 and 17 through the proper position of disc 30 and through the closing of contacts 8, the said devices close the circuit of a servo-motor 14 or 15 until the correct positioning is obtained.

If later the voltage appearing at the terminal 33 is switched to terminal 32, the recording of the measure of the visibility of the image of the signal light 11 may be produced by a circuit according to FIGURE 15. Whether light 11 whose image appears in 21 (FIG. 16) is visible or not, a positive or negative voltage appears at the output terminal 29. This output terminal 29 and the terminal 32 of the time switch reappear in the circuit shown in FIGURE 15. At the moment terminal 32 receives a voltage, a relay 34 connects the circuit as shown in the figure. If the measure voltage at the terminal 29 is positive, a relay 35 is actuated, which results into the closing of a switch 36, the interruption of the measuring circuit by a switch 37 and the connecting of a forwarding circuit 38 for the mobile arm 1 (FIG. 14). If on the contrary, the measure voltage at the terminal 29 is negative, a relay 39 is actuated, which results in the closing of a switch 40, the interruption of the measuring circuit by a switch 41, and the connecting of a switching display device 42 and the connecting of a nulling device 43 for the mobile arm 1. At the moment the voltage at terminal 32 disappears, following the rotation of disc 30, the relay 34 falls back and opens the measuring circuit as well as the circuits of switches 36 and 40.

The mechanical arrangement of the devices 38, 42 and 43 are shown in FIGURE 14. Assuming that circuit 2 controls the switching on of the nearest signal light 11, that the circuit 3 controls the switching on of the following signal light and so on, the circuit shown in FIGURE 15 enables to control the movement of the mobile arm 1 due to the intervention of the forwarding control device 38 and the nulling device 43. If the nearest signal light is easily visible, the following signal light is lighted and successively so are the other lights until a signal light is obtained whose visibility is not easily observed. At this moment arm 1 is brought back to its starting position.

The mobile arm 1 is solidly fixed to a shaft 44 which may be actuated either by the forwarding device 38, or by the nulling device 43. On the shaft 44 are mounted two other mobile arms 45 and 46, but these two arms 45 and 46 are not solidly fixed to the shaft 44.

The contact arm 45 may be made solidly fixed to the shaft 44 by means of an electromagnetic drive 47 and the contact arm 46 may be made solidly fixed to the shaft 44 by means of an electromagnetic drive 48. The display switching device 42, mentioned in the description of FIGURE 15 enables to electrically connect either the drive 47 or the drive 48. If as represented in FIGURE 14, the drive 47 is connected, the display circuit is closed by the mobile arm 46 and a switch 49 of the device 42. The display is obtained by the switching on of one of the signal lamps 10 to circuit 4" (as illustrated in FIG. 14) corresponding to circuit 4. If when the mobile arm 1 closes circuit 4, the luminous intensity of the image of the corresponding signal light 11, registered by the cell 22, is insufficient, the recording circuit (FIG. 15) actuates the display switching device 42 and then the nulling device 43. Consequently, the connection between contact 45 and shaft 44 is eliminated and said contact 45 remains on contact stud 4' where it was brought, while the mobile arm 46 is brought back to its zero position and is solidly fixed to shaft 44 by means of drive 48. Due to the simultaneous commutation of contact 49, the signal lamp 10 of circuit 4' identical to 4" remains illuminated. If during the following measuring step the visibility has decreased, the devices 42 and 43 are already actuated when the arms 1 and 43 are on the contact studs 3 and 3". At this moment, drive 48 is disengaged, the arm 45 is brought back on the contact stud 2' and solidly fixed to shaft 44 by means of the drive 47. Simultaneously the lamp 10 of circuit 4' is switched off and said lamp 10 of circuit 3" lights up.

The display symbolized by the lamps 10 takes into account the results of the successive measures of the visibility due to the memorizing device obtained by the arms 45 and 46 alternatively actuated. The measure and its display may therefore be entirely automatically executed.

Figure 15:
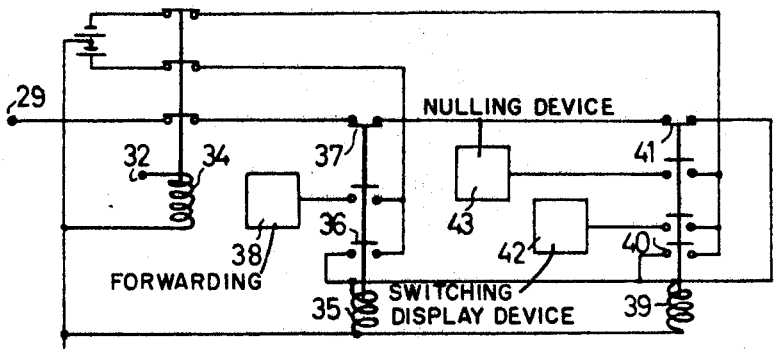
FIGURE 15 shows a circuit for the recording of the measuring of the visibility of a signal light.

The example described in view of FIGURES 14, 15 and 16 has the advantage that at each instant only one signal light is illuminated. Therefore there is no risk for the pilot to believe that he is facing the first signal lights of a runway. It is a simplified example for the purpose of facilitating the comprehension of the invention. The electromechanical circuits may be replaced by equivalent electronic circuits which are advantageously protected against bad weather, dust, and the perturbations caused by shocks etc. As a practical embodiment, this example carries a considerable vulnerability, if the signal lights are placed on frail posts in an airport. Precisely in view of the fog, such posts may be hit by for instance a vehicle and may occupy, after such an accident, suddenly another position than the one which should be in a normal optical alignment. Furthermore, an absolute necessity is required regarding the simultaneously and identical fading of cells 22 and 23 and of their amplifiers 26. Furthermore, this system does not enable a permanent control by a responsible observer. It results that this simplified system may be used only in cases where its indication does not have to be relied on constantly and should not be used in security system.

The indication of a measuring installation of the maximum visual distance in the fog must be absolutely reliable in a meteorological station in an airport. In such a case, a particularly advantageous solution consists in using as a screen the target of a television transmitter tube and as a measuring device, a device permitting to analyze the video signal transmitted by the transmitting tube.

Figure 17:
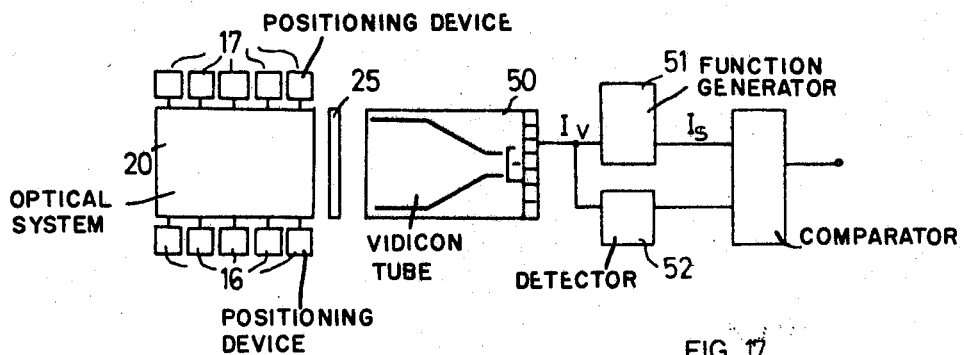
Figure 18:
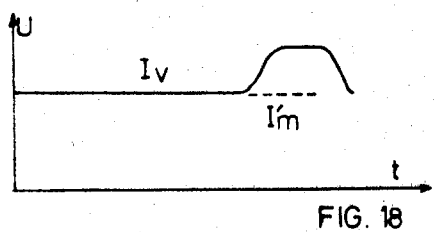
FIGURES 18, 19 and 20 show coordinate representations of signals of the circuit shown in FIG. 15.
Figure 19:
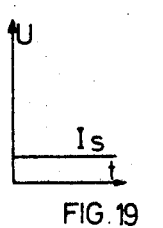
Figure 20:
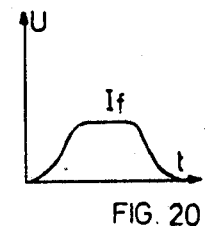

This new embodiment therefore replaces the circuit according to FIGURE 16; it is represented on FIGURE 17. The unchanged elements in view of FIGURE 16 are represented by the same reference numerals. Instead and in place of the photoelectrical cells, only one screen is foreseen, the target of a "Vidicon" tube 50. The video signal $I_v$ (FIG. 18) appearing at the output of this tube is brought on one hand at the input of a function generator circuit 51, sensitive at the mean level $I_m$ of the video signal, which generates a signal $I_s$ corresponding to the visibility threshold, that is, corresponding to the required increase of luminous intensity of a point in view of the surrounding luminosity so as to become visible. The video signal is applied on the other hand to a luminous point detector 52. At the output of the device 51 appears the continuous signal Is (FIG. 19) which varies in function of the surrounding luminosity and eventually of other data, for example, snowy ground. At the output of the device 52 appears a signal If (FIG. 20) corresponding to the difference of luminous intensity between the image of a lighted signal light and the surrounding luminosity. If a plurality of signal lights are simultaneously illuminated, only one of the visible signal lights during the exploration of the screen may be taken into consideration for the measure. This discrimination may be made for example in the detector 52. The signals coming from the devices 51 and 52 are compared in a comparison device 53 which produces the same voltages than the device 28 (FIG. 16), which is symbolized by the fact that its output terminal is designated by 29.

Figure 21:
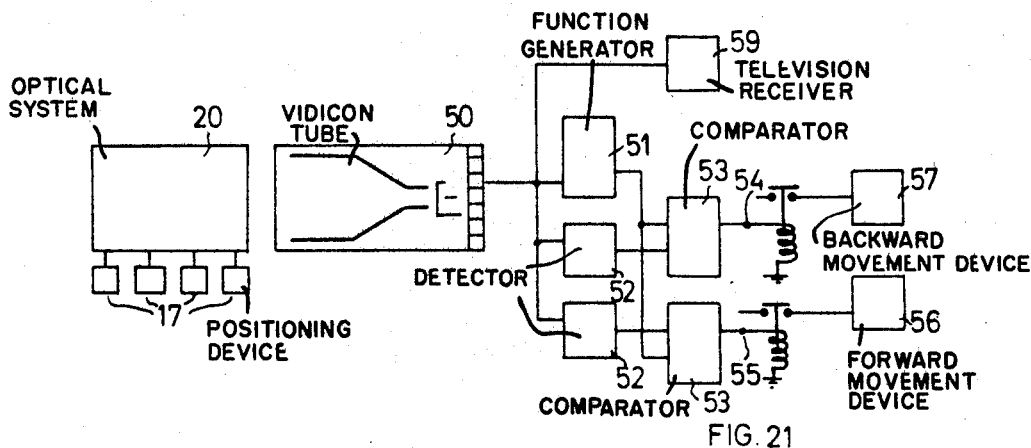
Figure 22:
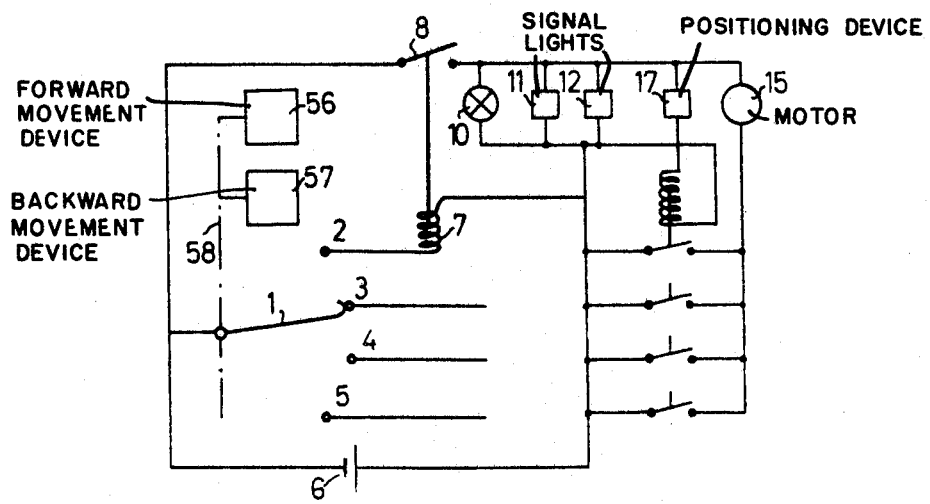
FIGURE 22 shows a control device for the simultaneous operation of two signal lights.

In a case where two signal lights 11 and 12 (FIG. 22) are simultaneously lighted, it is possible to foresee two devices 52 (FIG. 21) each being directed to detect the luminosity of the image of one of the illuminated signal lights and two comparison devices 53 enabling the control of the visibility of these two signal lights. The output terminals of these comparison devices are designated by 54 and 55; the signals appearing at these terminals represent respectively the visibility of the signal lights 11 and 12, 11 being the nearest light of the optical system 20, 12 being the most remote light of the optical system 20. The displayed visibility provided by the signal lamp 10 (FIG. 22) corresponds to the state where the signal at the output 54 is positive (visibility of light 11 above the threshold) and the output signal 55 is negative (visibility of light 12 below the threshold). If the output signal 55 becomes positive, a forward movement device 56 is connected, which leads shaft 58 of the arm 1 (FIG. 22) so that the visibility of the most remove signal lights be examined. If, on the contrary, the output signal 54 becomes negative, a backward movement device 57, is connected, which makes the shaft 58 move back from the mobile arm 1 (FIG. 22) so that the visibility of the nearest signal lights be examined. Then, a state of rest for the control device according to FIG. 22 is defined so that the control device is actuated at each moment the visibility conditions defined above are modified. It is pointed out that the utilization of a "Vidicon" tube 50 permits the elimination of the adjustment device for the alignment of the optical system 16 and its servomotor 14. It is sufficient to foresee a positioning device 17 for the local length and the corresponding servomotor 15. Nevertheless, the principal advantage of the systems according to FIGURE 17 or 21 consists in the fact that the video signal may be brought simultaneously in a television receiver 59 and that the responsible observer is not eliminated, but on the contrary becomes more free for a more adequate control of the functioning of the installation, while the measuring and the display of the results are taken care of by the automatic control through the same element than the one which is controlled by the direct vision: the video signal. The great advantage of this system consists of a device whose indications are completely reliable.

An optical system suitable for use in the invention has been disclosed in applicant's co-pending application. Ser. No. 680,912 filed Nov. 6, 1967 and entitled "Optical System for a Camera."

A suitable device for turning on lights has been disclosed in applicant's co-pending application Ser. No. 682,044 filed Nov. 13, 1967 and entitled "Device for Turning on Lights."

I claim:
1. An installation for measuring the maximum visual distance in the fog comprising a series of signal lights and at least one observation apparatus in which an optical system is arranged to observe the series of signal lights, a light responsive means on which the optical system projects the image of certain signal lights of the series and their surroundings, a control device for switching on or off one or a plurality of the signal lights of the series and for simultaneously modifying the focal length of the optical system in such a way that when the visibility is perfect, the image of any selected operated signal light is directed onto the light responsive means always about the same size independent of the distance between the selected signal light and the optical system, and threshold means connected to said light responsive means for indicating the presence of signal lights producing a predetermined output from the light responsive means.

2. Installation as defined in claim 1, wherein the optical system is oriented by said control device to obtain on the light responsive means an image of the operated signal lights always approximately at the same location.

3. Installation as defined in claim 1, wherein said control device simultaneously switches on three successive signal lights forming part of said series and wherein the distance of a signal light from the optical system is approximately equal to the distance of the preceding signal element from the optical system plus a predetermined percentage of said distance.

4. Installation as defined in claim 1 wherein the light responsive means comprises at least two photo cells whose output varies in response to the intensity of the incident light, means to which is applied the output of one photo cell receiving the ambient luminosity of the area surrounding the operated signal light and whose output signal provides a threshold signal, and a comparison device to which is applied the output of the second photo cell which receives the light emitted by the operated signal light and the output signal of said means.

5. Installation as defined in claim 1, wherein the light responsive means consists of a television transmitting pickup tube and further comprising a video signal pulse amplitude detector for the television transmitting pickup tube and a function generator producing an output proportional to the mean level of the video signal.

References Cited

UNITED STATES PATENTS

| 3,393,321 | 7/1968 | Früngel | 260—220 XR |
| 2,648,723 | 8/1953 | Goldsmith. | |
| 3,126,521 | 3/1964 | Brady | 250—218 XR |

FOREIGN PATENTS

| 1,128,301 | 4/1962 | Germany. |

JEWELL H. PEDERSEN, Primary Examiner

O. B. CHEW II, Assistant Examiner

U.S. Cl. X.R.

250—218